United States Patent [19]
Budaker et al.

[11] Patent Number: 6,035,740
[45] Date of Patent: Mar. 14, 2000

[54] STEERING COLUMN OF A MOTOR VEHICLE

[75] Inventors: Martin Budaker, Heubach; Gerhard Hägele, Hohenstadt, both of Germany

[73] Assignee: ZF Friedrichshafen AG, Friedrichshafen, Germany

[21] Appl. No.: 09/051,295

[22] PCT Filed: Oct. 12, 1996

[86] PCT No.: PCT/EP96/04455

§ 371 Date: Apr. 10, 1998

§ 102(e) Date: Apr. 10, 1998

[87] PCT Pub. No.: WO97/14600

PCT Pub. Date: Apr. 24, 1997

[30] Foreign Application Priority Data

Oct. 14, 1995 [DE] Germany ............ 195 38 303

[51] Int. Cl.[7] ........................ B62D 1/18
[52] U.S. Cl. .............. 74/493; 74/492; 280/775; 267/118; 267/120
[58] Field of Search ............ 74/492, 493; 280/775, 280/777; 267/64.11, 64.26, 120, 124, 64.12, 118; 188/300

[56] References Cited

U.S. PATENT DOCUMENTS

| | | | |
|---|---|---|---|
| 3,570,832 | 3/1971 | Ortheil ........................... | 267/64.16 |
| 3,811,337 | 5/1974 | Allison ........................... | 74/492 |
| 3,885,350 | 5/1975 | Scheben ........................ | 248/188.2 |
| 3,990,660 | 11/1976 | Pipoz ............................ | 248/642 |
| 4,240,619 | 12/1980 | Wirges et al. ................. | 267/120 |
| 5,113,716 | 5/1992 | Dumschat et al. ............. | 74/493 |
| 5,242,195 | 9/1993 | Wendling ...................... | 74/493 |
| 5,332,260 | 7/1994 | Heinrichs et al. .............. | 74/493 |

FOREIGN PATENT DOCUMENTS

| | | |
|---|---|---|
| 0 381 188 | 8/1990 | European Pat. Off. . |
| 0 417 730 | 3/1991 | European Pat. Off. . |
| 3513340 | 10/1986 | Germany . |
| 40 34 819 A1 | 5/1992 | Germany . |
| 2 060 137 | 4/1981 | United Kingdom . |

*Primary Examiner*—David A. Bucci
*Assistant Examiner*—William C. Joyce
*Attorney, Agent, or Firm*—Larson & Taylor

[57] ABSTRACT

A gas compression spring (10), is built into the telescoping shaft (1, 2) of a steering shaft. Via a cap element (12), the gas compression spring (10) presses against an articulated fork (6) and the piston rod (11) of the gas compression spring (10) presses against a lower articulated fork (7). The gas compression spring (10) and the piston rod (11) are accommodated in a stepped bore (8) of a sliding part (2) of the steering shaft of the telescoping shaft.

4 Claims, 1 Drawing Sheet

STEERING COLUMN OF A MOTOR VEHICLE

BACKGROUND OF THE INVENTION

The invention relates to an axially adjustable steering column for motor vehicles, whose steering shaft has parts that telescope inside one another, such as a steering shaft tube and a sliding part of the steering shaft, which to attain play-free engagement are loaded against one another in the circumferential direction.

DESCRIPTION OF THE PRIOR ART

From German Patent Application DE 40 34 819 A1, a steering column for motor vehicles is known which has an integrated hydraulic cylinder that can be actuated in the axial direction. The hydraulic height adjustment by means of the pressure chambers is done with the aid of solenoid valves, a pressure limiting valve and a check valve. A pump already present for the onboard hydraulic system can be used as a source of pressure medium. This kind of steering system includes a relatively large number of additional parts and takes up a large amount of structural space.

When the clamping device of an adjustable steering column is undone, the steering wheel drops to its lowermost adjusted position, both by its own weight and the weight of the adjustable parts of the steering column. In an extreme case, the weight of the steering wheel and of the upper parts of the steering column can be as much as 30 kg. The driver on adjusting the position of the steering wheel must therefore overcome by force, this weight, in order to put the steering wheel into the desired position. This can be done only by exerting great force.

To absorb the force of this weight, a compression spring is therefore built in between the displaceable parts of the telescoping shaft. The telescoping shaft is the connection between the steering wheel and the upper steering column. Because of the strong forces and the relatively small structural space available, the compression spring has a high spring constant and thus creates a major force increase over the adjusting range.

Thus, the force of the weight cannot be compensated for over the entire stroke length range. Because of the restricted structural space available, the compression spring can be accommodated only on the outer diameter of the telescoping shaft, which has the disadvantage of considerably increasing this outer diameter. The stroke length limitation, that is, the end stop for the compression spring, must be accomplished by the telescoping shaft. Given the strong spring forces, the result can be damage to the ball guide of the telescoping shaft.

SUMMARY OF THE INVENTION

The object of the invention is to relieve the driver of this high force of the weight as he adjusts the position of the steering wheel. This solution should not take up any additional structural space.

According to the invention, this object is attained by a gas compression spring built into the upper portion of the sliding part of the steering shaft which is braced via a piston rod against a structural component connected to the steering shaft tube. The spring constant of the gas compression spring can be designed in such a way that the change in force over the stroke length range is minimal; that is, the force that counteracts the force of the weight varies only insignificantly over the aforementioned adjustment range of the steering column. When the clamping device of the steering column is undone, the steering wheel "floats" in its position. In contrast to known steering systems, no additional structural space is needed for the gas compression spring. The gas compression spring has its own stroke length limitation, so that no destructive forces act upon the telescoping shaft.

In a further feature of the invention, the sliding part of the steering shaft has a stepped bore for receiving the gas compression spring, and this bore is closed off by a cap element. The piston rod extends through the reduced-diameter portion of the stepped bore and is braced on an articulated fork connected to the steering shaft tube.

It is expedient to provide a ball guide, comprising longitudinal grooves and balls, between the steering shaft tube and the sliding part of the steering shaft, which guide can compensate for the relative motions between the driver's cabin and the chassis of the vehicle.

DETAILED DESCRIPTION OF THE PREFERRED EMBODIMENT

Figure 1:
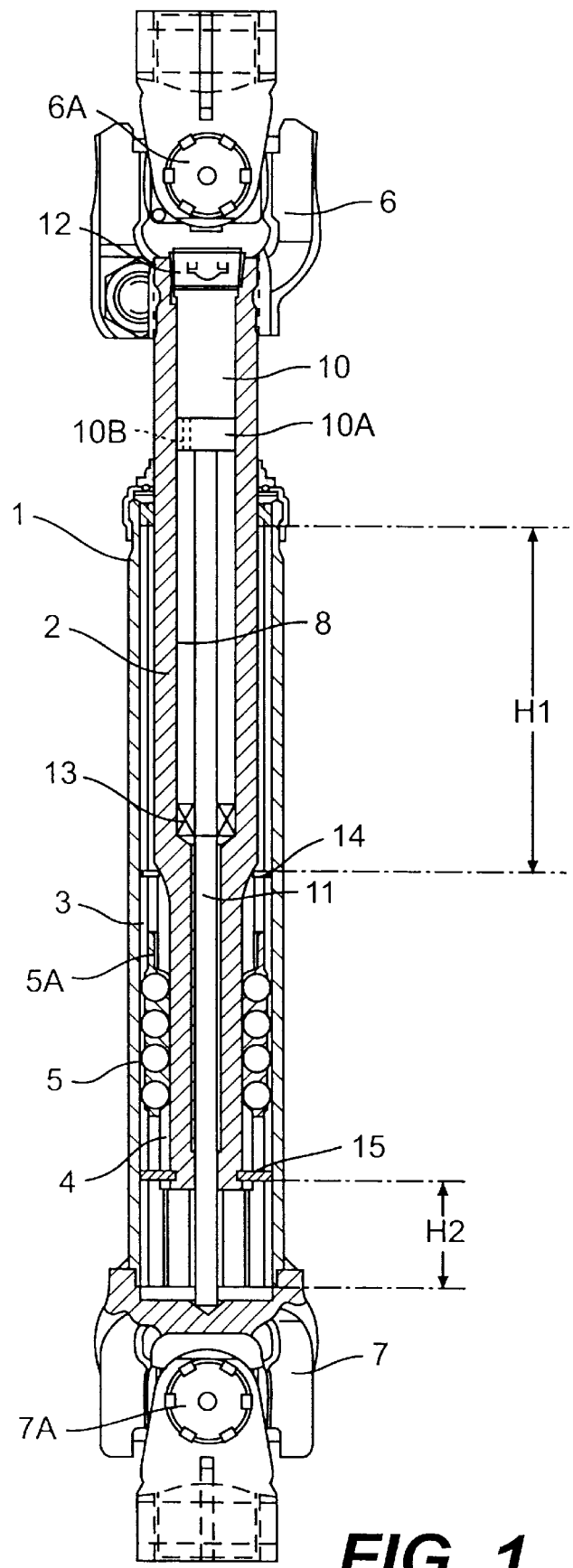
FIG. 1 is a cross-sectional view of a steering column of a motor vehicle in accordance with the present invention.

A steering shaft tube 1 and a sliding part 2 of the steering shaft of a telescoping shaft have longitudinal grooves 3 and 4 on the inner and outer diameter, respectively. Balls 5 are inserted between these longitudinal grooves to provide low-friction displacement. The upper end of the sliding part 2 of the steering shaft has an articulated fork 6 of a cross joint 6A, and the lower end of the steering shaft tube 1 has an articulated fork 7 of a cross joint 7A. The sliding part 2 of the steering shaft has a stepped bore 8, in which a gas compression spring 10 is integrated, the gas compression spring comprising a piston 10A with a passage 10B therethrough and a piston rod 11. Pressure chambers above and below the piston 10A are filled with gas in a manner known per se.

The stepped bore 8 is closed off on the upper end by a cap element 12. The end of the gas compression spring 10 is braced on this cap element 12 against the sliding part 2 of the steering shaft. A seal 13 is located on the lower end. The piston rod 11 is braced on the articulated fork 7, so that the steering shaft tube 1 and the sliding part 2 of the steering shaft are forced apart by the gas compression spring 10. The piston 10A is shown in the built-in position. A stroke H1 to the top and a stroke H2 to the bottom are available. The strokes H1 and H2 dictate the possible range of adjustment. The balls 5, which are guided in a cage 5A, allow rolling friction upward as far as a stop ring 14 and downward as far as a stop ring 15. Sliding friction takes place as well. Within the rolling friction, the relative motions between the driver's cabin and the chassis can be compensated.

We claim:

1. A combination of an axially adjustable steering column and a steering wheel of a motor vehicle comprising:

a steering shaft including a lower steering shaft tube and an upper sliding part to which the steering wheel is connected, said steering shaft tube and said sliding part telescoping inside one another, and said steering shaft further including a bearing mechanism which loads said steering shaft tube and said sliding part against one another in a circumferential direction to attain a play-free telescoping engagement whereby said upper sliding part and the attached steering wheel together exert a combined downward weight relative to said steering shaft tube;

a structural component connected to said steering shaft tube; and a self-contained gas compression spring built into said sliding part and including a piston, two pressure chambers separated by said piston, a flow path between said pressure chambers providing flow between said chambers at all times and lacking any flow cutoff valve therefor, and a piston rod extending from said piston and braced against said structural component, said gas compression spring solely compensating for substantially the combined downward weight of said sliding part and the steering wheel connected thereto relative to said steering shaft tube at all times such that said sliding part and the steering wheel connected thereto float weightless relative to said steering shaft tube at all times and such that said sliding part and said steering shaft tube are freely adjustable relative to one another free of the combined weight.

2. A combination of an axially adjustable steering column and a steering wheel as claimed in claim 1:

wherein said sliding part of said steering shaft has a stepped bore having a reduced portion and a cap element which closes off said stepped bore, said stepped bore receiving said gas compression spring;

wherein said piston rod extends through the reduced portion of said stepped bore; and wherein said structural component is an articulated fork connected to said steering shaft tube.

3. A combination of an axially adjustable steering column and a steering wheel as claimed in claim 2;

wherein said bearing mechanism is a ball guide having longitudinal grooves and balls provided between said steering shaft tube and said sliding part.

4. A combination of an axially adjustable steering column and a steering wheel as claimed in claim 1;

wherein said bearing mechanism is a ball guide having longitudinal grooves and balls provided between said steering shaft tube and said sliding part.

* * * * *